UNITED STATES PATENT OFFICE.

ELLIS MILLER, OF NEW YORK, N. Y.

ART OF GROWING PLANTS.

1,353,931. Specification of Letters Patent. Patented Sept. 28, 1920.

No Drawing. Application filed June 29, 1918, Serial No. 242,525. Renewed August 12, 1920. Serial No. 403,150.

*To all whom it may concern:*

Be it known that I, ELLIS MILLER, a citizen of the United States, residing in the city, county, and State of New York, have invented certain new and useful Improvements in the Art of Growing Plants, of which the following is a specification.

My invention relates to the growing of plants, using the word "plants" in its broad sense to include plant life of all kinds, whether cereals, vegetables, flowers or other forms.

My invention is based on the discovery which I have made that certain radio-active materials, if used in a suitable manner and in amounts suitably related to the number of plants to be treated, will substantially increase the leafage and fruit of said plants, not only in the aggregate but also in a given period of time as compared with like plants similarly treated in every way except that no radio-active material is used in connection with their growth; and this I find to be true whether or not the usual doses of fertilizer are employed.

In the practice of my invention in connection with growing plants, I incorporate the radio-active material with the soil in which the plants are grown either by mixing therewith, or by applying as a top dressing or by sprinkling the soil and plants with water containing the material in suspension.

It is the object of my invention to provide the radio-active material in a form suitable for plant life generally whether flowers, vegetables or cereals and whether growing in pots, in gardens, or on farms. More particularly, it is the object of my invention to provide a material of the character specified which shall be especially suited for farm use.

A further object of my invention is to provide a mode of preparing and using my improved material.

I will now describe the invention in detail. I take the tailings of carnotite ore as they come from the refineries or mills through which they have been passed in order to extract their radium content. Such ores are found in Colorado, certain parts of South America, South Australia and Austria, and refineries in which they are treated exist in most if not all of these places. These tailings still contain a very small amount of radio-active material, too small, however, to be commercially extracted in the present state of the art.

I first heat the tailings to about 350° or 400° C., thus drying them and driving out injurious impurities the exact character of which I have been unable to ascertain. The dried tailings are then thoroughly ground to pass a mesh of about 50 or 55 to the inch after which they are thoroughly mixed with some diluent material such as peat, sawdust, coal dust, lime or the like, in the proportion of about, preferably, 1 part tailings to 5 parts of the inert material. This mixing may be done at the place where the tailings are prepared and treated, as above described, or, if preferred, the prepared and treated tailings only may be shipped to the user who may do his own mixing at the place of use. This latter practice, obviously, is the most economical of the two in that transportation and labor charges are cut down.

The "mix," as above described, may be applied to the soil by spreading it uniformly thereover in amounts, preferably equal to, but not substantially greater than 240 lbs. to the acre and then working it in; or the same amount may be used as a top dressing. Or it may be mixed with fertilizer, the latter, with its content of radio-active material, being then applied in the usual way.

The applications just mentioned may be made before the seed is planted or at any stage of the plant growth as may seem best. In deciding as to this the same considerations should determine as would be in mind were it a case of applying fertilizer alone.

The effect of the applications of radio-active material by either of the several described modes is to substantially hasten the maturity of the plant. The foliage and fruitage of the plant are also very considerably increased in amount. And, speaking generally, a very marked increase of vigor and vitality is produced.

I am unable to say, positively, just why the applications of radio-active material, as above described, should produce the truly remarkable beneficial results described. It is believed, however, that the radio-active elements destroy injurious fungi, bacteria, and parasites; and furthermore, that these elements act as a stimulant so as to increase the functional activities of the plants. And that, probably, both these activities concur The effect of the radio-active material will be entirely independent of and unaffected by any fertilizers whether applied in conjunction with the radio-active material or in disjunction therefrom. And so far as my observations have extended, the action of the fertilizer seems to be independent of and unaffected by that of the radio-active material. Each, the radio-active material and the fertilizer, seems to exert its own independent effect and the effect of either may be independently varied by suitably varying the amount of radio-active material or of fertilizer as the case may be.

Radio-active materials, as is well known, seem to have a practically inexhaustible supply of energy or radiant activity which they give off continuously at a constant rate. As a result of this, the beneficial effect of my applications of radio-active material is not temporary but continues indefinitely so long as the material itself remains favorably situated in the soil. The improved growth of the plant is not obtained, as with fertilizers, by chemical combination with the radio-active elements but by reason of the radiant energy given off by such elements and absorbed by the plants. But, of course, a certain percentage of the radio-active material will leach out of the soil or be washed away each year and this portion must be replaced if the beneficial effect is to be maintained constant.

Instead of applying the "mix" (i. e. the 1 to 5 mixture of tailings and inert material) to the soil in the amount specified, I may, if I prefer, add 1 lb. of higher grade radio-active material to every 100 lbs. of "mix" and then use 30 lbs. to the acre of this latter mixture. By "higher grade" material I mean material in which every 1000 kgs. contains substantially 200 mgs. of radium.

Having described my invention, I claim:

1. The improvement in the art of preparing a radio-active composition for plant growth which comprises heating and then grinding the tailings of crude carnotite ore, and finally mixing with inert material.

2. The improvement in the art of preparing a radio-active composition for plant growth which comprises heating the tailings of crude carnotite ore to at least 350° C., then grinding and finally mixing with inert material.

3. The improvement in the art of preparing a radio-active composition for plant growth which comprises heating the tailings of crude carnotite ore to at least 350° C., then grinding to a mesh of from 50 to 55 to the inch and finally mixing with inert material.

4. A composition comprising tailings of crude carnotite ore which have been heated and then ground, the temperature of heating having been at least 350° C.

5. The improvement in the art of growing plants which comprises treating them with tailings of crude carnotite ores which have been heated and ground.

6. The improvement in the art of growing plants which comprises treating them with tailings of crude carnotite ores which have been heated and ground, the amount of said tailings used being not substantially in excess of 40 lbs. to the acre.

In testimony whereof I have hereunto set my hand.

ELLIS MILLER.